United States Patent [19]

Hadley et al.

[11] Patent Number: 5,199,346
[45] Date of Patent: Apr. 6, 1993

[54] APPARATUS FOR HIGH SPEED STERILIZATION OF IRREGULARLY SHAPED CONTAINERS

[75] Inventors: Jeffery A. Hadley, Clovis; William C. Kreamer, San Jose, both of Calif.

[73] Assignee: FMC Corporation, Chicago, Ill.

[21] Appl. No.: 693,252

[22] Filed: Apr. 29, 1991

[51] Int. Cl.⁵ ............ A23L 3/04; A23L 3/06; A61L 2/00; A61L 2/04

[52] U.S. Cl. .................... 99/362; 99/371; 99/477; 198/952; 422/297; 422/304

[58] Field of Search ............ 99/359–362, 99/366, 368, 371, 483, 470, 477–479; 422/302, 304, 297; 426/412, 407; 198/952

[56] References Cited

U.S. PATENT DOCUMENTS

| | | | |
|---|---|---|---|
| 900,064 | 9/1908 | Forhan | 99/371 |
| 2,695,555 | 11/1954 | Carvallo | 99/362 |
| 3,165,055 | 1/1965 | van der Winden | 99/362 |
| 3,286,619 | 11/1966 | Lee | 99/362 |
| 3,533,670 | 10/1970 | Karnikyan | 422/297 |
| 3,545,985 | 12/1970 | Mencacci et al. | 99/362 |
| 3,972,679 | 8/1976 | Ruig | 426/412 |
| 4,015,935 | 4/1977 | Andersson et al. | 422/297 |
| 4,157,061 | 6/1979 | Margus, Jr. | 99/371 |
| 4,385,035 | 5/1983 | Akitoshi et al. | 422/304 |
| 4,636,366 | 1/1987 | Langen | 99/362 |

FOREIGN PATENT DOCUMENTS 1440499 11/1988 U.S.S.R. .................... 422/302

Primary Examiner—Timothy F. Simone
Attorney, Agent, or Firm—Michael Lee; R. C. Kamp; R. B. Megley

[57] ABSTRACT

A carrier for holding irregularly shaped containers for movement through a hydrostatic sterilizer. The carrier adapts irregularly shaped containers for movement through a sterilizer which can also process contents of cylindrical food cans. A plurality of openings in the carrier allows fluid and steam to surround the containers for uniform processing of the contents of the containers.

4 Claims, 3 Drawing Sheets

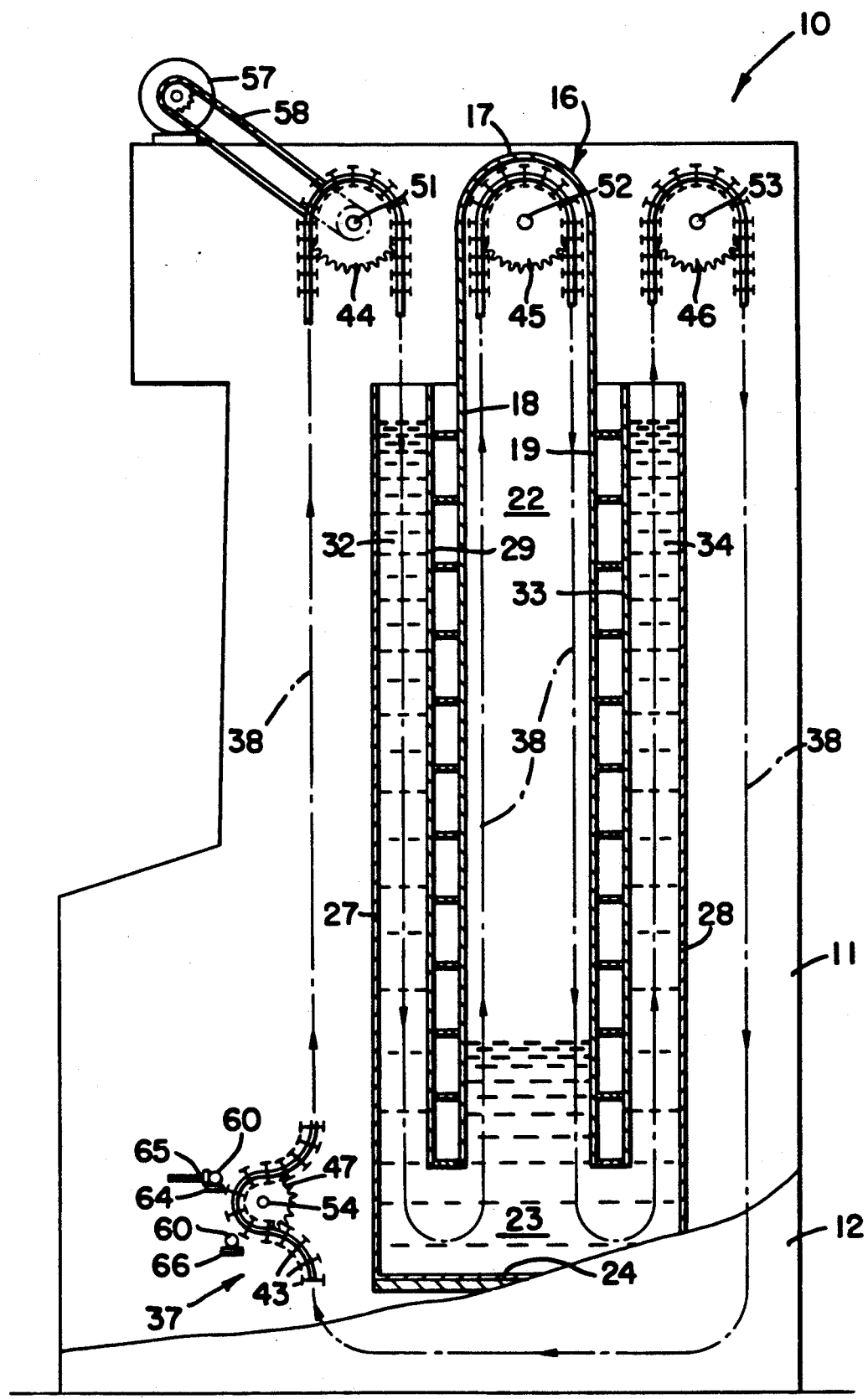
FIG_1

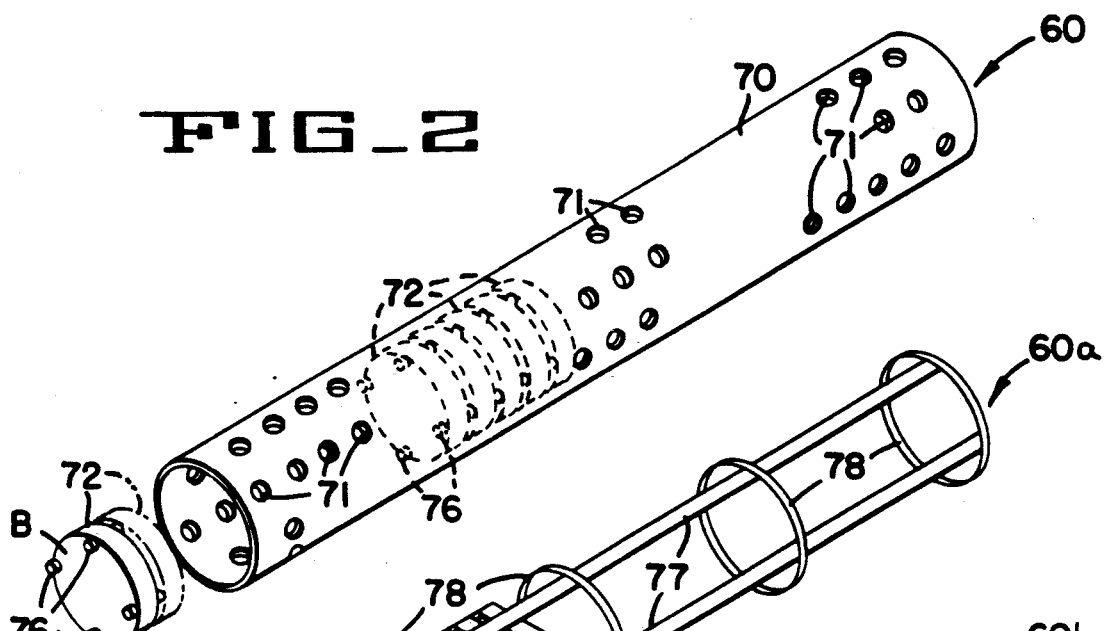
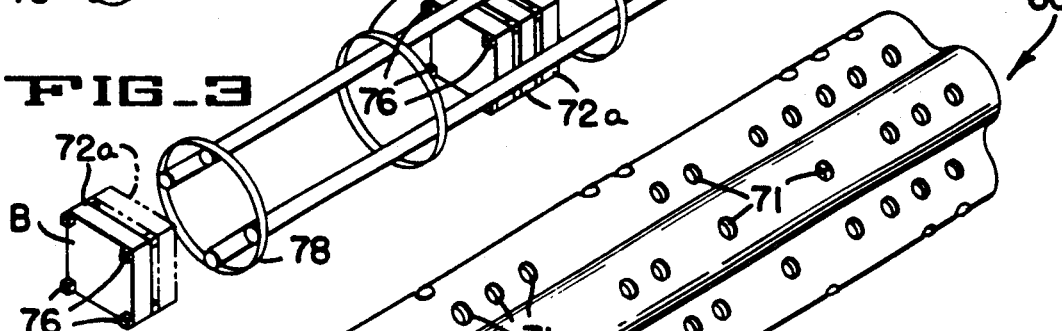
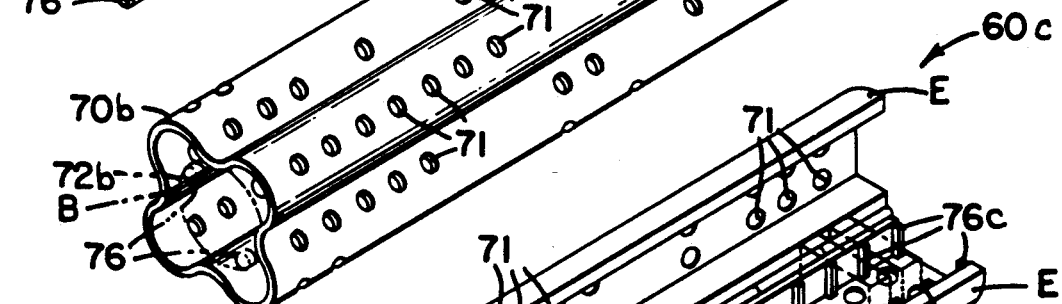
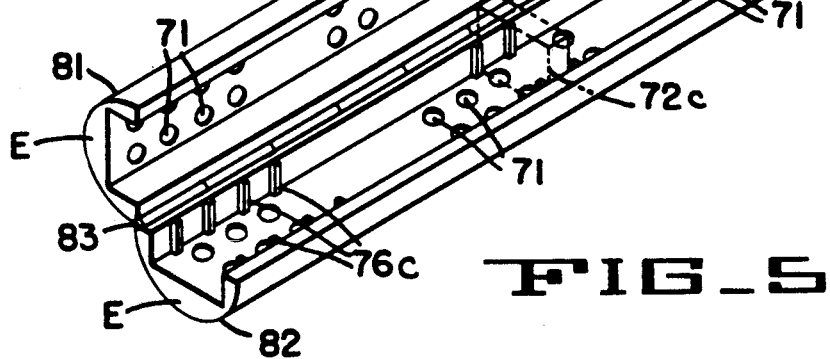

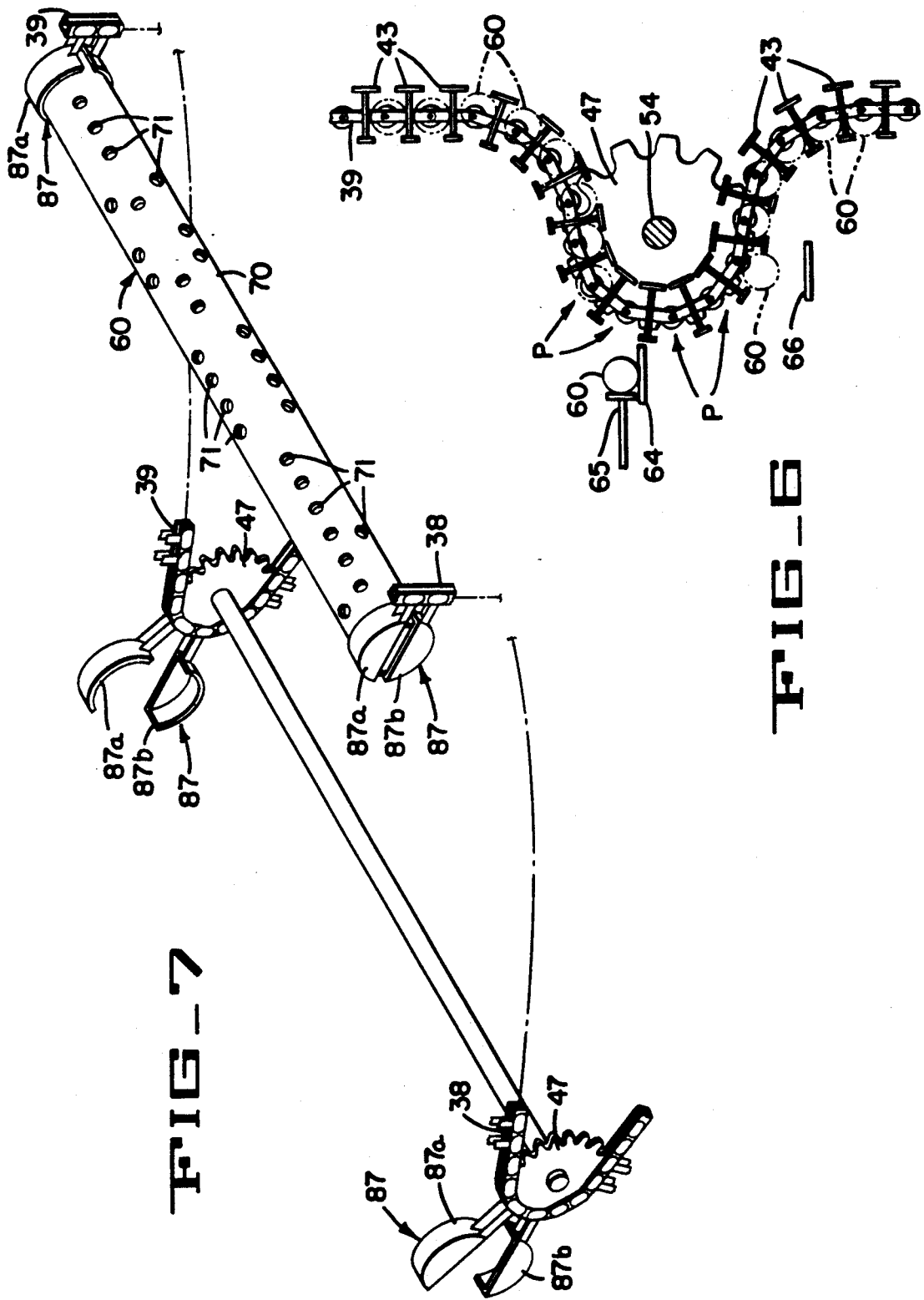

APPARATUS FOR HIGH SPEED STERILIZATION OF IRREGULARLY SHAPED CONTAINERS

BACKGROUND OF THE INVENTION

The present invention pertains to hydrostatic sterilizers, and more particularly, to carriers for holding irregularly shaped containers for movement through a sterilizer.

Hydrostatic sterilizers are generally between fifty and sixty feet tall so as to support water columns through which containers are moved vertically for sterilization. The widths of the sterilizers are usually sufficient to accommodate an endless conveyor having carriers thereon which are several feet long. The carriers are normally of the type which handle cylindrical cans or other cylindrical containers.

SUMMARY OF THE INVENTION

The present invention discloses hydrostatic sterilizer carriers which handle irregularly shaped containers, such as trays having prepared meals commonly known as TV dinners. The carriers can be of a generally cylindrical shape with a plurality of openings to allow fluid flow and heat transfer to containers in the carriers. A cross-section of the carriers can be shaped to provide orienting surfaces for the containers. A plurality of spacers between the containers facilitate movement of fluid into a space between containers to facilitate heat transfer to the containers.

BRIEF DESCRIPTION OF THE DRAWINGS

FIG. 1 is a fragmentary diagrammatic vertical section of a hydrostatic sterilizer in which the present invention can be used.

FIG. 2 is an isometric drawing of an embodiment of a container carrier of the present invention.

FIGS. 3-5 illustrate other embodiments of container carriers of the present invention.

FIG. 6 is an enlarged drawing of a portion of the hydrostatic sterilizer of FIG. 1 illustrating the loading and unloading of carriers into the hydrostatic sterilizer.

FIG. 7 is an isometric drawing showing another apparatus for mounting a container carrier in a hydrostatic sterilizer.

DESCRIPTION OF THE PREFERRED EMBODIMENT

A chain type hydrostatic sterilizer 10 (FIG. 1) in which the present invention can be used includes a pair of spaced vertical support walls 11, 12 suitably supported in an upright position. A housing 16 which extends between walls 11 and 12, has a rounded upper end 17 and two depending walls 18 and 19 which cooperate with walls 11 and 12 to define a cooking chamber 22 which is filled with steam at a predetermined cooking pressure and temperature. The lower end of housing 16 opens into a water-filled trough 23 which is formed by the walls 11 and 12, a transfer horizontal plate 24 and the lower end portions of two transverse vertical walls 27 and 28. The wall 27 cooperates with another transverse vertical wall 29 to define an inlet hydrostatic water leg 32 and wall 28 cooperates with a transverse vertical wall 33 to provide an outlet hydrostatic water leg 34. The hydrostatic legs 32 and 34 communicate with trough 23 and are filled with water so as to create sufficient pressure to resist the pressures of steam in cooking chamber 22. The inlet hydrostatic water leg 32 is thermostatically controlled to provide a gradually increasing water temperature from approximately 218° F. at its upper end to approximately 245° F. at its lower end. The outlet water leg 34 is also thermostatically controlled to provide a gradual decrease of water temperature from approximately 245° F. at its lower end to any suitable temperature below the boiling point of water at atmospheric pressure, depending upon the type of containers being handled, at the upper end thereof. Steam is added to water in hydrostatic inlet leg 32 to provide the desired heating temperature therein and cold water is directed into the outlet or cooling leg 34 to provide the desired cooling temperature therein.

A sterilizer conveyor 37 for moving containers through sterilizer 10, comprises a pair of endless chains 38 and 39 (FIG. 7) having a plurality of elongated spaced carrier bars 43 (FIG. 6) mounted therebetween. The chains 38 and 39 are trained around transversely aligned pairs of sprockets 44–47 (FIG. 1) which are keyed to a plurality of shafts 51–54, respectively, that are journaled on the side walls 11 and 12. A variable-speed motor 57 is connected to shaft 51 by a chain drive 58 and drives the conveyor 37 in the direction of the arrows indicated on the pitch line shown in FIG. 1 of the path travel of the conveyor. A plurality of elongated carrier bars 43 (FIGS. 1, 6) are disposed between and evenly spaced along the chains 38 and 39 and serve to support a plurality of rows of container carriers 60 therebetween.

As is well known in the art, container carriers 60 are fed into and discharged from a plurality of pockets P as the carrier bars are moved around a sharp curve. Accordingly, as the carrier bars 43 of the conveyor 37 (FIGS. 1, 6) move around the sharp bend defined by the sprockets 47, rows of container carriers to be processed are pushed from a feed conveyor 64 into the open pockets P by any suitable type of feed mechanism 65. After the rows of containers have traveled through the entire sterilizer, the rows of containers fall by gravity from the open pockets P onto a discharge conveyor 66.

A container carrier 60 (FIG. 2) of the present invention, includes an elongated cylindrical tube 70 having a plurality of holes 71 to allow fluid and steam to transfer to a plurality of containers 72 inside tube 70. A plurality of spacers 76 between containers 72 facilitate the movement of fluid about containers 72 for uniform processing of the contents of the containers. The spacers can be placed between each of the containers as the containers are being loaded into carrier 60. Spacers 76 can also be molded to a bottom B of each of the containers 72 to allow faster loading of containers and spacers into carriers 60. Containers 72 and the associated spacers 76 are loaded into carriers 60 at a remote location. Carriers 60 are then moved by conveyor 64 (FIG. 1) into position adjacent to sterilizer conveyor 37 and are loaded into pockets P for movement through sterilizer 10.

Another embodiment of a container carrier 60a (FIG. 3) includes a plurality of elongated rods 77 interconnected by a plurality of annular members 78. Rods 77 can be spaced to accommodate irregularly shaped containers 72a of various types, such as TV dinner containers. The containers shown are rectangular in shape, but a wide variety of sizes and shapes of containers can be used. A plurality of spacers 76 are mounted on a bottom B of each of the containers 72a.

Another embodiment of a container carrier 60b (FIG. 4) includes an elongated formed tube 70b having a cross-sectional shape to hold a plurality of generally rectangular containers 72b. Spacers 76 are mounted on the bottom B of containers 72b in the manner disclosed in FIGS. 2 and 3. A plurality of holes 71 allow fluid and steam to surround each of the containers 72b for fast and uniform processing of the contents of containers 72b.

A hinged type of container carrier 60c (FIG. 5) includes a pair of carrier halves 81, 82 connected by an elongated hinge 83. A plurality of containers 72c mounted in carrier 60c are spaced apart by a plurality of spacers 76c, mounted in carrier half 82. When carrier 60c is opened into the position shown in FIG. 5 containers 72c can be quickly moved radially into position between spacers 76c rather than loaded from the end as required in carriers 60, 60a, 60b of FIGS. 2–4. Holes 71 allow fluid and steam to surround containers 72c (FIG. 5) as carrier 60c is moved through sterilizer 10 (FIG. 1). Carrier halves 81, 82 can also be made with sheet metal ends E and having a plurality of rods or wires connected between ends E.

Another apparatus for securing container carriers 60 (FIG. 7) to endless chains 38, 39 includes a plurality of clamps 87 for connecting to each of the end portions of carriers 60. Only two clamps 87 are shown, but a pair of clamps 87 replaces each of the pockets P shown in FIGS. 1 and 6. As a clamp 87 moves around a sharp curve of sprocket 47 (FIG. 6) the jaws 87a, 87b (FIG. 7) separate to allow an end portion of carrier 60 to be placed between jaws 87a, 87b as the jaws move past feeder conveyor 64 (FIG. 6). Jaws 87a, 87b also separate to release end portions of carrier 60 from the jaws as carrier 60 is adjacent to discharge conveyor 66 (FIG. 6).

Thus, the present invention includes a plurality of hydrostatic sterilizer carriers which handle irregularly shaped containers. The carriers can be mounted in conventional sterilizers which are also used to process cylindrical cans and bottles.

Although the best mode contemplated for carrying out the present invention has been herein shown and described, it will be apparent that modification and variation may be made without departing from what is regarded to be the subject matter of the invention.

What is claimed is:

1. An improved hydrostatic sterilizer having a sterilizing chamber with a sterilizing medium therein, and a conveyor for moving a plurality of filled containers through the sterilizing chamber wherein an improvement comprises:
   a carrier for holding a plurality of irregularly shaped containers wherein said carrier includes a plurality of annular members and a plurality of elongated rods, said elongated rods being interconnected by said annular members; and
   means for mounting said carrier on a conveyor for moving said containers through a sterilization chamber.

2. An improved hydrostatic sterilizer having a sterilizing chamber with a sterilizing medium therein, and a conveyor for moving a plurality of filled containers through the sterilizing chamber wherein an improvement comprises:
   a carrier for holding a plurality of irregularity shaped containers, said carrier having a plurality of openings to allow a sterilizing medium to move inside said carrier wherein said carrier includes a hinged elongated tube having a pair of carrier halves and an elongated hinge connected between said carrier halves, said carrier halves being pivoted about said hinge to allow radial movement of said containers into and out of said hinged tube;
   a plurality of spacers mounted between said containers to allow said sterilizing medium to surround said containers for uniform processing of a product in said containers; and
   means for mounting said carrier on a conveyor for moving said containers through a sterilization chamber.

3. An improved hydrostatic sterilizer having a sterilizing chamber with a sterilizing medium therein, and a conveyor for moving a plurality of filled containers through the sterilizing chamber wherein an improvement comprises:
   a carrier for holding a plurality of irregularly shaped containers, said carrier having a plurality of openings to allow a sterilizing medium to move inside said carrier;
   a plurality of spacers mounted between said containers to allow said sterilizing medium to surround said containers for uniform processing of a product in said containers; and
   means for mounting said carrier on a conveyor for moving said containers through a sterilization chamber wherein said mounting means includes first and second clamps, means for connecting said first and said second clamps to said sterilizer conveyor, said first clamp securing a first end of said carrier to a first portion of said sterilizer conveyor, and said second clamp securing a second end of said carrier to a second portion of said sterilizer conveyor.

4. An improved hydrostatic sterilizer having a sterilizing chamber with a sterilizing medium therein, and a conveyor for moving a plurality of filled containers through the sterilizing chamber wherein an improvement comprises:
   a carrier for holding a plurality of irregularly shaped containers, said carrier having a plurality of openings to allow a sterilizing medium to move inside said carrier.
   a plurality of spacers mounted between said containers to allow said sterilizing medium to surround said containers for uniform processing of a product in said containers; and
   means for mounting said carrier on a conveyor for moving said containers through a sterilization chamber wherein said mounting means includes first and second drive chains, said first drive chain being connected to a first side of said conveyor, said second drive chain being connected to a second side of said conveyor, first and second drive sprockets, said first drive chain being trained about said first drive sprocket, said second drive chain being trained about said second drive sprocket, first and second carrier clamps each having a pair of jaws for gripping an end of said carrier, means for connecting said first carrier clamp to said first drive chain with said first drive chain causing said jaws or said first carrier clamp to open as said first drive chain carries said carrier clamp over said first drive sprocket, and means for connecting said second carrier clamp to said second drive chain with said second drive chain causing said jaws of said second carrier to open as said second drive chain carries said second carrier clamp over said second drive sprocket.

* * * * *